Aug. 19, 1958
A. JÄPPELT ET AL  2,848,302
METHOD OF PRODUCING AMMONIUM SULFATE AND
FERROUS HYDROXIDE FROM FERROUS
SULFATE PICKLE LIQUOR
Filed July 20, 1954
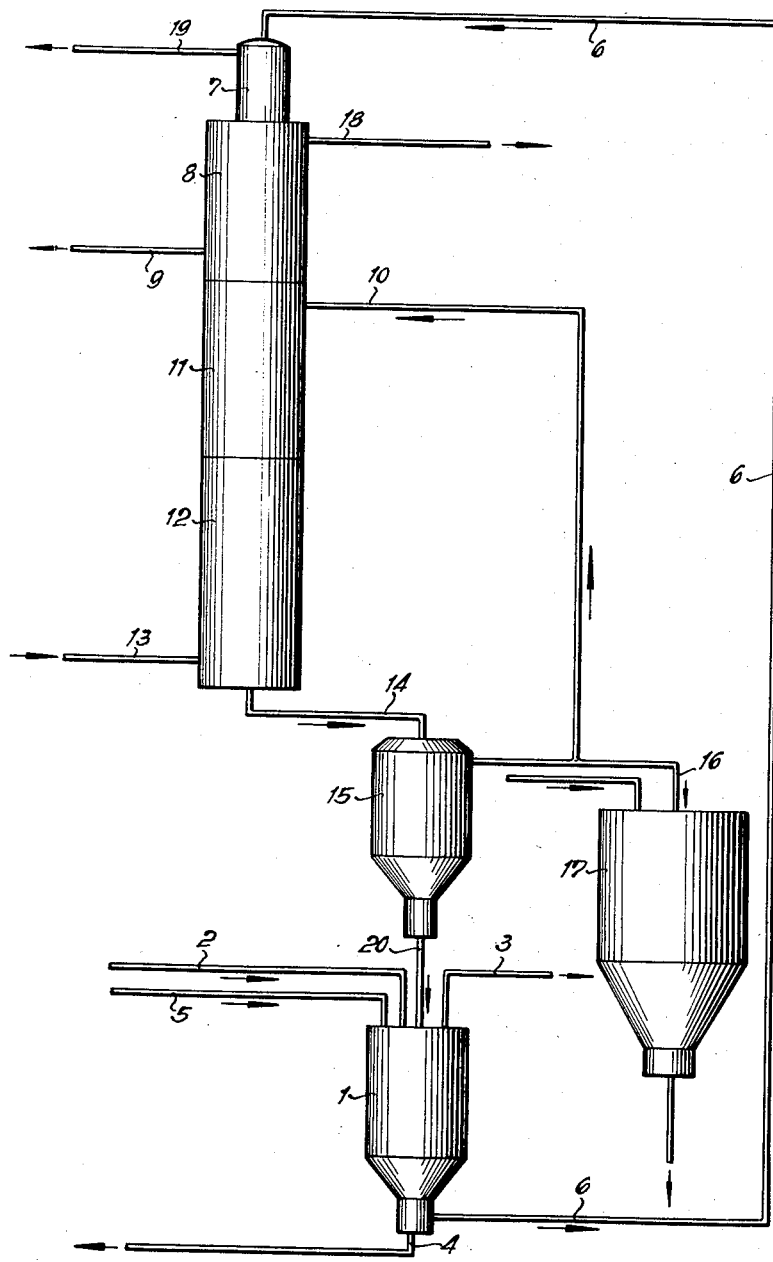
INVENTORS
ALFRED JÄPPELT,
ALEXANDER DOERGES
HELMUT SCHADE
BY Dicke and Padlow, Attorneys

United States Patent Office 2,848,302
Patented Aug. 19, 1958

2,848,302

METHOD OF PRODUCING AMMONIUM SULFATE AND FERROUS HYDROXIDE FROM FERROUS SULFATE PICKLE LIQUOR

Alfred Jäppelt and Alexander Doerges, Dortmund, and Helmut Schade, Castrop-Rauxel, Germany, assignors to F. J. Collin Aktiengesellschaft, Dortmund, Germany Application July 20, 1954, Serial No. 444,562

2 Claims. (Cl. 23—119)

The present invention applies to a method of using sulfuric acid iron salt solutions, particularly pickling waste liquors.

In the iron and steel industry considerable quantities of so-called waste pickling liquor, containing sulfuric acid and iron sulfate are obtained which waste pickling liquor must be removed from the pickling process. The economical utilization of this waste liquor and particularly the utilization of the free and fixed sulfuric acid affords substantial difficulties so that in many cases it must be eliminated by diluting it and discharging it into streams.

It has already been proposed to react the pickling waste liquor with ammonia so as to form ammonium sulfate and iron hydroxide. It has furthermore been endeavored to obtain crystalline $FeSO_4 \cdot 7H_2O$ from the waste pickling liquor. However, a sufficient market does not exist for the heptahydrate obtained in this manner. Further processing to the monohydrate and the roasting to oxide and $SO_2$ are cumbersome and costly. Finally, it has also been endeavored to convert the iron sulfate into iron powder and hydrogen sulfide by reduction with hydrogen-containing gases. For reasons of economy the previously known methods have not been able to gain a footing.

Furthermore, it has been proposed to use waste pickle liquors directly for coke oven gas purification. However, only part of ammonia and hydrogen sulfide could be removed from the gas, and the reaction products have not been used economically, because proposed roasting of ferrous sulfide and ferrous hydroxide is inconvenient.

In accordance with the present invention, the sulfuric acid-ferrous salt solutions, especially of waste pickling liquors, are treated with for instance, coke oven gases containing ammonia, hydrogen sulfide and hydrogen cyanide, in such a manner that ammonium sulfate, iron hydroxide, iron cyanide compounds and if necessary also iron sulfate are obtained. The process supposes the ammonia content of the gas to be at least equivalent to the sum of its hydrogen sulfide and hydrogen cyanide contents. If there is less ammonia, the gas is treated before entering in the process in such a way as to reduce its hydrogen sulfide content.

The new cyclic process is performed as illustrated in the annexed drawing forming part of the invention. In the first stage of the process, into the decomposer 1 are introduced waste pickle liquor by pipe 2, sulfuric acid and water by pipe 5 and sludge from the fifth stage of the process by pipe 20. The reaction yields gaseous hydrogen sulfide which is evolved through pipe 3, insoluble ferro-cyano-compounds which are withdrawn at 4 and a neutral or weakly acid strong solution of ferrous sulfate which is fed to the next stage of the process by pipe 6. In this connection the free sulfuric acid of the waste pickling liquor is bound up in the form of iron sulfate by means of the iron sulfide obtained as intermediate product in the process. The hydrogen sulfide which is released can be further processed in the known manner to sulfuric acid or sulfur. The iron sulfate is first of all converted by means of ammonia into iron hydroxide which reacts in part with $H_2S$ and HCN. Any excess iron hydroxide which may have been formed can be separated and utilized. Intermediate compounds produced in the process such as iron sulfide and ammonium ferro cyanide compounds are converted into iron sulfate by the pickling waste liquor, possibly with the addition of sulfuric acid. This iron sulfate can be removed from the process.

The process of treatment of the waste liquor is preferably effected in a plurality of cycles or stages in accordance with the attached illustrative drawing.

In the first stage of the process, the free sulfuric acid of the waste pickling liquor is reacted in the decomposer 1, which it enters through pipe 2, with the intermediate products obtained in the process. In this connection, hydrogen sulfide and possibly also a small amount of HCN and $CO_2$ are released, leaving the decomposer at 3. In the decomposer there remain insoluble iron cyanide compounds which are removed at 4 and worked into Prussian blue.

This solution contains some dissolved hydrogen sulfide. Therefore, before contacting it with gas for purification purposes, it is degasified in degasifier 7 by means of a small part of already purified gas. Hereby the gas takes up hydrogen sulfide. It is fed back by pipe 19 to the crude gas on the suction side of the exhauster, not shown. The degasified solution is contacted in the second stage 8 of the process with coke oven gas or other gas containing ammonia and coming from the third stage of the process. Thereby ammonia is removed from the gas, and the purified gas passes out by pipe 18. In the liquor, ammonium sulfate is formed, and some ferrous hydroxide is precipitated. This hydroxide or part of it may be withdrawn by pipe 9 by separating the precipitate and returning the filtrate to the scrubber 8. In the next or third stage 11 of the process, the liquor from the second stage 8 of the process is contacted with coke oven gas or other gas containing ammonia, coming from the fourth stage 12 of the process. Also, a circulating ammoniacal solution of ammonium sulfate is added through pipe 10. As a result, most of the ferrous sulfate still contained in the liquor from contacting stage 8 is reacted to form ferrous hydroxide and ammonium sulfate. In the fourth stage 12 of the process, the liquor from stage 11 is contacted with crude coke oven gas or other gas containing ammonia, hydrogen sulphide and hydrogen cyanide and entering through pipe 13. Ferrous hydroxide is reacted with hydrogen sulfide and hydrogen cyanide, forming insoluble ferrous sulfide and ferro-cyano compounds. The sludgy liquor is fed to the fifth stage of the process; namely, a sludge separator or filter 15 through pipe 14. The resultant precipitated ferrous sulfide, ferro-cyano-compounds and some ferrous hydroxide, are fed to the decomposer 1 through pipe 20. By reaction with pickle liquor and sulfuric acid, hydrogen sulfide is evolved and ferrous sulfate in solution is formed. There remains a residue of insoluble ferro-cyano compounds.

The liquor from the sludge separator 15 is a slightly ammoniacal or strong solution of ammonium sulfate. Part of it is recirculated to the contacting stage 11. Another part is fed to evaporator plant 17 by pipe 16 and processed to crystalline ammonium sulfate by evaporation.

The described new process has the advantage that the utilization of waste pickle liquor is combined with gas purification. Thereby, the sulfate-ions present in waste pickle liquor are reacted so as to yield ammonium sulfate after contact with the gas. This means that not only the free acid of waste pickle liquor but also the fixed sulfate is used and thereby sulfuric acid for ammonium sulfate production is saved. That part of ammonia in the gas which is surplus in regard to hydrogen sulfide and hydrogen cyanide may be used to produce highly active ferrous hydroxide for oxide gas purification, for reduction to metallic iron powder or other purposes. Cyanide sludge obtained in the process may be used to produce pigments or chemicals or may be sintered and used in blast furnaces as iron ore. Hydrogen sulfide produced in the process may be processed to sulfuric acid.

The process presupposes that the ammonia content of the gas is at least equivalent to the sum of the $H_2S$ and HCN contents of the gas. If necessary when the $H_2S$ content is too high, the desired equivalence can be produced by a corresponding preliminary treatment.

The reactions taking place in the method proceed with sufficient rapidity even at normal temperature. Higher temperatures are conducive to the process so that possibly the heats of reaction produced can be utilized.

It may furthermore be advantageous to degasify the iron sulfate solution passing from the decomposer to the scrubber and which may contain dissolved $H_2S$, in a pre-scrubbing stage 7 by means of a small branch-stream of the gas leaving the scrubber at 18. This branch gas stream is removed at 19.

While a preferred method of obtaining useful products from pickling waste liquors, it is to be noted that changes as to steps and operational procedures and use of materials may be made without departing from the spirit and scope of the invention as claimed.

We claim:

1. A cyclic process for the utilization of waste pickle liquor containing ferrous sulfate and sulfuric acid comprising a series of stages as follows: in a first stage, treating the waste pickle liquor with sulfuric acid and with insoluble reaction products obtained by contacting crude coke oven gas containing hydrogen sulphide, hydrogen cyanide and at least as much ammonia as is equivalent to the sum of hydrogen sulfide and hydrogen cyanide contents, with a scrubbing liquor containing ferrous sulfate, during such treatment evolving gas rich in hydrogen sulphide; in a second stage contacting the liquor resulting from the first stage with coke oven gas coming from the next succeeding stage and containing ammonia, whereby all the ammonia is removed from the gas and some ferrous hydroxide is precipitated; in a third stage contacting the liquor from the second stage with coke oven gas coming from the fourth stage of the process and containing ammonia, and adding a circulating ammoniacal solution of ammonium sulfate, whereby part of ammonia is removed from the gas, and ferrous hydroxide is precipitated; in a fourth stage contacting the liquor from the third stage with coke oven gas containing hydrogen sulphide, hydrogen cyanide and at least as much ammonia as is equivalent to the sum of the hydrogen sulphide and hydrogen cyanide contents of the gas, whereby hydrogen sulfide, hydrogen cyanide and part of ammonia are removed from the gas and ferrous sulfide and ferro cyano-compounds are precipitated; in a fifth stage, separating the insoluble reaction products from the resulting ammoniacal ammonium sulfate solution and delivering the insoluble reaction products to the first stage there to be treated with waste pickle liquor and sulfuric acid, recirculating a portion of the ammonium sulfate solution to the third stage and processing another portion by evaporation to crystalline ammonium sulfate.

2. A cyclic process for utilization of waste pickle liquor containing ferrous sulfate and sulphuric acid, comprising the following series of stages: in a first stage, treating the waste pickle liquor with sulfuric acid and with insoluble reaction products, obtained by contacting crude coke oven gas, containing hydrogen sulphide, hydrogen cyanide and at least as much ammonia as is equivalent to the sum of hydrogen sulfide and hydrogen cyanide contents, with a scrubbing liquor containing ferrous sulfate, whereby insoluble cyanide compounds are formed, separating the resultant insoluble cyanide compounds, contacting the resulting scrubbing liquor in several stages with crude coke oven gas containing hydrogen sulphide, hydrogen cyanide and at least as much ammonia as is equivalent to the sum of hydrogen sulfide and hydrogen cyanide contents, adding recirculated ammoniacal ammonium sulfate solution so as to remove ammonia, hydrogen sulphide and hydrogen cyanide from the gas and to produce a solution rich in ammonium sulfate which can be processed by evaporation to crystalline ammonium sulfate.

References Cited in the file of this patent

UNITED STATES PATENTS

| | | |
|---|---|---|
| 2,008,253 | Klempt | July 16, 1935 |
| 2,322,134 | Hodge | June 15, 1943 |
| 2,511,306 | Tiddy | June 13, 1950 |
| 2,662,812 | Shaw | Dec. 15, 1953 |

OTHER REFERENCES

Meade: "Modern Gas Works Practice," London, Benn Bros., 1921, page 398.